United States Patent [19]

Tomecek

[11] Patent Number: 4,853,694

[45] Date of Patent: Aug. 1, 1989

[54] ELECTRONIC TANK LEVEL MONITORING DEVICE

[76] Inventor: Jerry Tomecek, Rt. 3 Box 11A, Fairhope, Ala. 36532

[21] Appl. No.: 127,192

[22] Filed: Dec. 1, 1987

[51] Int. Cl.$^4$ ............................................. G08B 21/00
[52] U.S. Cl. .................................. 340/621; 73/290 V
[58] Field of Search ............. 340/621, 619; 73/290 V, 73/290 B; 364/509; 367/908

[56] References Cited

U.S. PATENT DOCUMENTS

| | | | |
|---|---|---|---|
| 3,100,885 | 8/1963 | Wekjiwutz et al. | 340/621 X |
| 4,210,969 | 7/1980 | Massa | 367/108 |
| 4,229,798 | 10/1980 | Rosie et al. | 364/564 |
| 4,264,788 | 4/1981 | Keidel et al. | 179/110 |
| 4,470,299 | 9/1984 | Soltz | 73/290 |
| 4,487,065 | 12/1984 | Carlin et al. | 73/290 |
| 4,535,627 | 8/1985 | Prost et al. | 73/290 |
| 4,578,997 | 4/1986 | Soltz | 73/290 |
| 4,583,170 | 4/1986 | Carlin et al. | 364/509 |

Primary Examiner—Joseph A. Orsino
Assistant Examiner—Jeffery A. Hofsass
Attorney, Agent, or Firm—Krass & Young

[57] ABSTRACT

The present invention is an electronic liquid level monitoring apparatus for a in-ground storage tank. An ultrasonic transducer is disposed in a fill pipe head device which enables proper placement of the ultrasonic transducer in a fixed position relative to the fill pipe of the storage tank and provides a combination for a plurality of different fill pipe diameters. An electronic control measures the length of time from the transmission of the ultrasonic pulse to the receipt of the return echo and then calculates the distance from the ultrasonic transducer to the level of the liquid in the tank. The distance can permit automatic calculation of the amounts of liquid in the tank, using tank parameters stored in a memory as corrected for the speed of sound at the particular temperature measured via a temperature sensor. The apparatus preferably also calculates a volume variance. In this embodiment a communications device such as a modem can be employed for transmission of the tank data from the monitoring apparatus to an external device.

19 Claims, 2 Drawing Sheets

4,853,694

ELECTRONIC TANK LEVEL MONITORING DEVICE

TECHNICAL FIELD OF THE INVENTION

The technical field of the present invention is that of electronic monitoring of the level of liquid in a tank, such as the fuel supply tank of a gasoline station.

BACKGROUND OF THE INVENTION

There is a continuing need to monitor the level of liquid in an in-ground liquid storage tank. Such in ground liquid storage tanks are typically employed for storage of liquid from the time of delivery until use. Such storage tanks are also used for temporary storage of liquid at a wholesaler's location from the time of receipt until it is removed for delivery to a retailer or at a retail location from the time of delivery until sale to the customer. Such in-ground storage tanks are typically formed of cylinders having a substantially vertical fill pipe connecting the tank interior to a surface tank inlet permitting the tank to be filled. It is typical to include an outlet at the bottom of the tank whereby liquid may be withdrawn from the tank for use or delivery to a customer.

It is necessary to periodically monitor the liquid level in such in-ground storage tanks for a number of reasons. Firstly, in the case of tanks where the outlet of liquid is unmetered there exists a need to determine the liquid level within the tank. In addition, even if the outlet of the tank is metered it is necessary to periodically check the liquid level within the tank in order to ensure the accuracy of the inflow and outflow metering. In addition, it is advisable to periodically independently determine the liquid level within a tank in order to determine whether or not the tank is leaking. Even with metered inflows and outflows, such liquid level measurement is required for leak detection. Such leak detection is particularly desirable in the case in which the liquid stored in the storage tank is some hazardous or potentially hazardous material. Often there are environmental regulations requiring the owners or users of such in-ground liquid storage tanks to periodically test for leaks. As a consequence, it is desirable test the liquid level within such tanks.

Heretofore two primary systems have been employed for determining the liquid level within the tank. The first method is a purely manual method. This method requires a stick having a length somewhat greater than the length from the top of the fill pipe to the bottom of the tank at that location. The operator lowers the stick into the tank until it reaches the bottom. The stick is then withdrawn and the level of the liquid is observed against a scaled rule on the stick. This liquid depth is then converted manually into the corresponding volume of liquid within the tank based upon the known tank parameters such as diameter, length and the length of the fill pipe. This technique requires a relatively large labor cost and, due to the manual calculations required, provides a relatively low level of accuracy.

The second known technique for measuring the liquid level for such in-ground storage tanks involves the use of an in-tank electronic measuring apparatus. Such in-tank liquid level measuring apparatus typically employ an ultrasonic ranging technique. The ultrasonic ranging may occur within the liquid in the tank from the bottom of the tank to the liquid surface or from the top of the tank down to the liquid surface. Because it is known that the speed of sound changes with ambient temperature, many such systems employ ultrasonic reflection targets at a fixed distance form the transmit/-receive transducer. The return echo from this fixed reference is employed in order to calibrate the return echo from the liquid level.

These in-tank liquid level sensors typically are very expensive and require a large amount of time to mount in an existing tank. As such this is a very expensive solution for retrofit to existing tanks. In addition, it is very expensive and extremely cumbersome to service or to modify such in-tank liquid level monitors. Accordingly there is a need in the art for a inexpensive, easy to install liquid level monitoring device.

BRIEF DESCRIPTION OF THE INVENTION

The present invention is an electronic liquid level monitoring apparatus for a in-ground storage tank having a substantially vertical fill pipe. This monitoring apparatus includes an ultrasonic transducer which can transmit and receive ultrasonic sounds. The ultrasonic transducer is disposed in a fill pipe head device which enables proper placement of the ultrasonic transducer in a fixed position relative to the fill pipe of the storage tank and provides a combination for a plurality of different fill pipe diameters.

The ultrasonic transducer is connected to an electronic control device. This electronic control device causes the ultrasonic transducer to transmit an ultrasonic sound pulse and to receive a return echo. The electronic control device measures the length of time from the transmission of the ultrasonic pulse to the receipt of the return echo and then calculates the distance from the ultrasonic transducer to the level of the liquid in the tank and subtracts the known preprogrammed distance from the top of the fill pipe to the bottom of the tank. This difference distance is the equivalent of the stick distance measured in the manual stick method. Thus this distance can permit calculation of the amounts of liquid in the tank in the same manner as in the prior art.

In accordance with a further embodiment of the present invention the electronic control device of this invention includes a temperature measuring device which generates a signal indicative of the ambient temperature. The electronic control device calculates the distance based upon the speed of sound at the particular measured temperature.

In accordance with a further embodiment of the present application the electronic control device includes a memory which stores tank parameters including such things as the diameter and length of the liquid storage tank. The electronic device then employs these tank parameters together with the distance measured via the ultrasonic transducer to compute the amount of liquid stored in the storage tank. In the preferred embodiment the apparatus includes a display of volume of liquid in the tank.

In accordance with a further embodiment of the present invention the electronic liquid level monitoring apparatus is usable for a plurality of storage tanks. The apparatus prompts the user to input via a keyboard the tank number prior to taking the measurements. This tank number then permits the apparatus to recall the appropriate tank parameters including the tank dimensions for computation of the volume based upon the distance to the liquid and the dimensions of a particular tank. In accordance with this embodiment, the liquid volume for the specified tank is stored in a memory corresponding to the particular selected tank. In this embodiment, the electronic apparatus preferably also calculates a volume variance for each particular tank which is equal to the volume for that particular tank last stored in the memory plus the liquid inflows, minus the liquid outflows and minus the currently measured volume for that particular tank. This volume variance is also stored within the memory. In this embodiment a communications device such as a modem can be employed for transmission of the tank data from the monitoring apparatus to an external device.

In a further embodiment of the present invention the electronic liquid level monitoring apparatus includes provision for receiving a temperature signal from an external temperature measuring device which may be placed inside the liquid inside the storage tank. This permits a correction to be made to the volume calculation based upon the temperature of the liquid in the tank. By testing the liquid temperature and calculating the liquid volume at two different times and correcting the computed liquid volume for the two possibly different temperatures, it is possible to determine whether or not there is a net inflow or outflow of liquid from the tank.

BRIEF DESCRIPTION OF THE DRAWINGS

These and other aspects of the present invention will become clear form the following description taken in conjunction with the figures in which.

DETAILED DESCRIPTION OF THE PREFERRED EMBODIMENT

Figure 1:
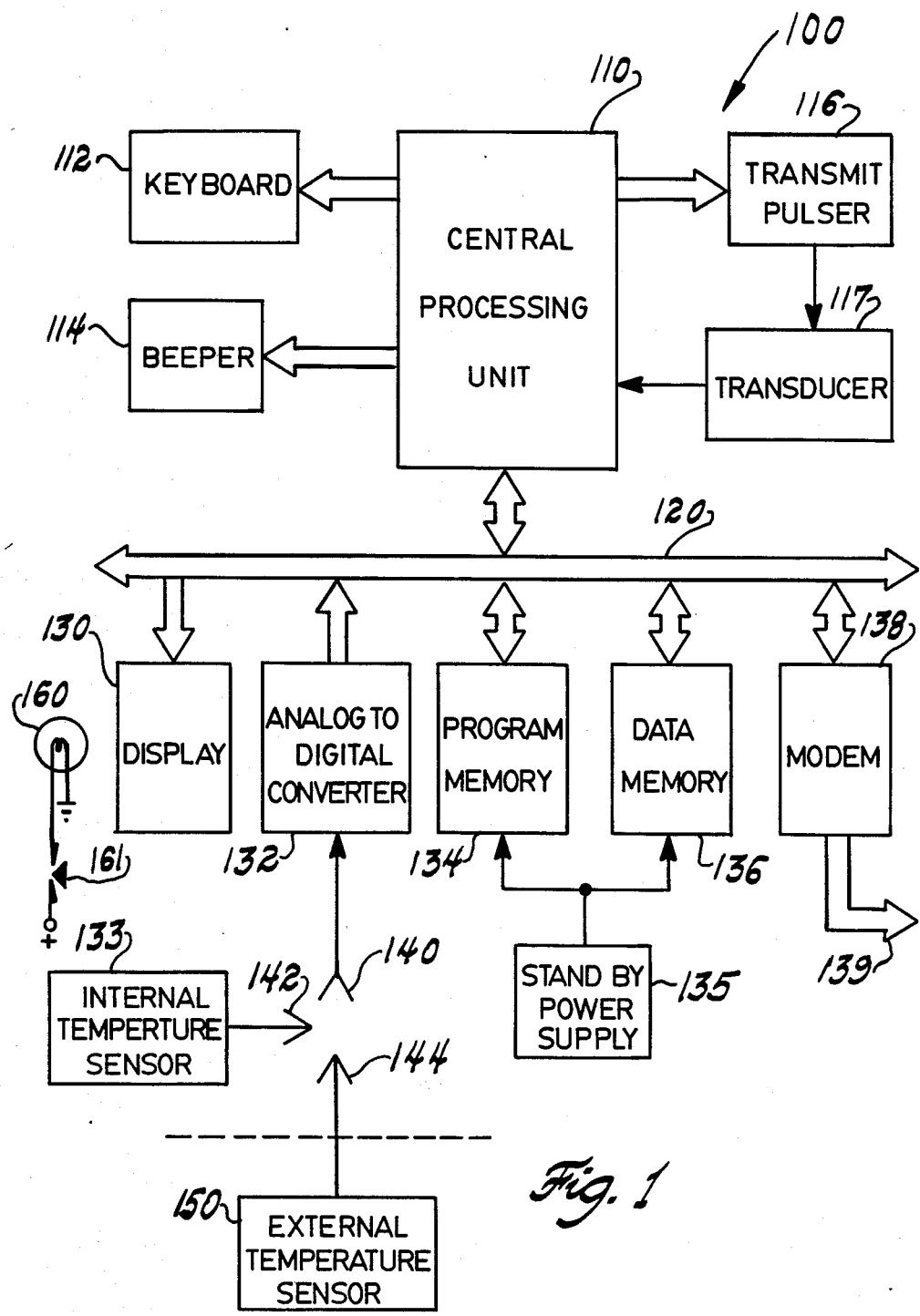
FIG. 1 illustrates a schematic diagram of the electronic liquid level monitoring apparatus of the present invention.

FIG. 1 illustrates a schematic diagram of the electronic liquid level monitoring apparatus 100 of the present invention. Electronic liquid level monitoring apparatus 100 includes central processing unit 110 which is connected to keyboard 112, audio beeper 114, transmit pulser device 116, transducer 117 and bus 120. Connected to bus 120 is visual display 130, analog to digital converter 132, program memory 134, data memory 135 and modem 138. Analog to digital converter 132 is alternatively connected to internal temperature sensor 133 or external temperature sensor 150. Associated with visual display 130, which is preferably a liquid crystal display, is back light 160 and momentary contact push button switch 161. Momentary actuation of push button switch 161 enables visual display 130 to be viewed in the dark. Both program memory 134 and data memory 136 are connected to a standby power supply 135, which supplies power to retain both the program for control of central processing unit 110 and the data recorded by the electronic liquid level monitoring apparatus 100 when the power is turned off. Modem 138 is further connected to an external connector 139 which enables an external device to be connected to the electronic fuel monitoring apparatus 100.

Figure 2:
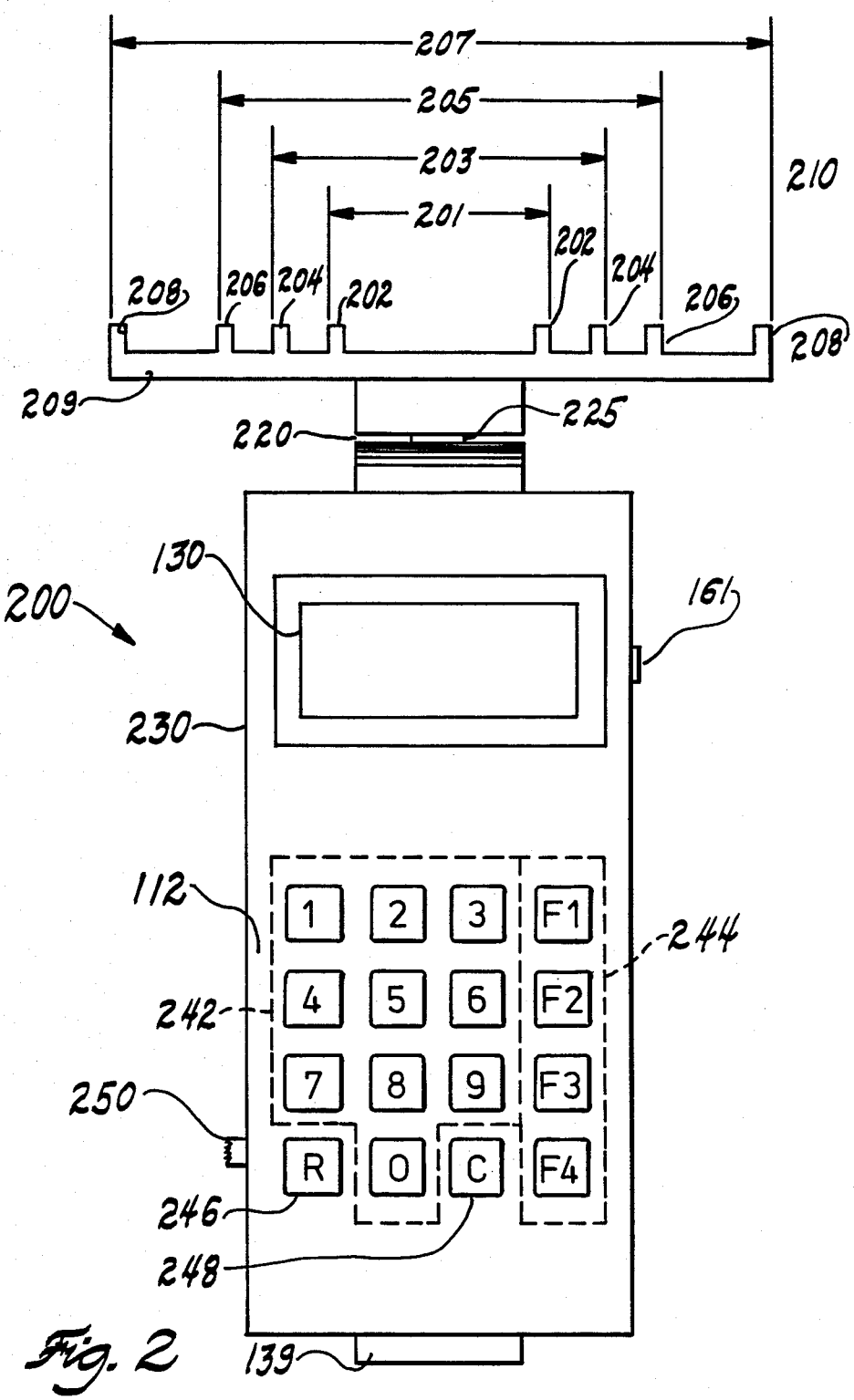
FIG. 2 is a plan view of the handheld electronic liquid level monitoring apparatus in accordance with the present invention.

FIG. 2 illustrates a plan view 200 of the electronic liquid level monitoring apparatus. This electronic liquid level monitoring apparatus includes a fill pipe head device 210, a hinge 220 having a connector 225, and a handheld body 230. The fill pipe head device 210 includes a set of concentric ridges 202, 204, 206 and 208 mounted upon a plate 209. These ridges have respective diameters 201, 203, 205 and 207. In accordance with the preferred embodiment of the present invention the transducer 117 is located in the center of the ridges 202. Ridge 202 has a diameter 201 of two inches, ridges 204 has a diameter 203 of three inches, ridges 206 has a diameter 205 of four inches and ridges 208 has a diameter 207 of six inches. This set of ridges 202, 204, 206 and 208 forms a concentric set of ridges of varying diameter.

Fill pipe head device 210 is employed to properly position transducer 117 in the fill pipe during use of the device. The fill pipe head device 210 is inserted into the fill pipe in an inverted position until one of the set of ridges 202, 204, 206 or 208 engages the pipe. The diameter of the set of ridges has been selected to correspond substantially to the most often used fill pipe diameters for underground liquid storage tanks. It is believed that this set of concentric ridges 202, 204, 206 and 208 will substantially center transducer 117 within the fill pipe opening regardless of the particular diameter of fill pipe employed.

Fill pipe head device 210 is rotatably coupled to liquid level monitoring device body 230 via a hinging couple 220. This permits the user to properly locate the fill pipe head device 210 while retaining access to the display and controls on the body 230. The hinging couple 220 includes a connector 225 which permits the fill pipe head device to be removed from the body 230 for transportation or storage.

Body 230 includes on its front face the operator interface devices. These are display 130 and keyboard 112. Display 130 is preferably a multiple character liquid crystal display which enables the apparatus to display prompts to the user and to display the results of the measurements of the liquid level monitoring apparatus 100. Note that push button switch 161 is mounted on the side of body to enable the user to light display 130 via light 160.

Keyboard 112 includes the digit keys 242 which include the digits from 0 to 9. Keyboard 112 further includes a set of function keys 244 which include the function keys F1, F2, F3, and F4. This functions keys 244 enable the operator to command the electronic liquid level monitoring apparatus 100 to perform the desired function in a manner that will be more fully disclosed below. Keyboard 112 further includes R key 246 and C key 248. The use of these keys will be fully described below.

Note that body 230 also includes main power switch 250, shown as a slide switch mounted on the side of body 230. Main power switch 250 is employed to turn the apparatus on or off.

Lastly body 230 includes a connector 139. Connector 139 is coupled to modem 138 and enables an external device to access the bus 120 of the electronic liquid level monitoring apparatus 100. This permits the electronic liquid level monitoring apparatus 100 to transmit data to the external device. It may also permit data and/or programs to be transmitted to electronic liquid level monitoring apparatus 100.

The operation of the electronic liquid level monitoring apparatus will be described below in conjunction with Tables 1, 2 and 3. Table 1 indicates the process of initial tank set-up. Table 2 indicates the process of forming a stick reading, corresponding to the use of a manual stick for reading the liquid level. Table 3 corresponds to the computation of the volume in the tank. Table 4 corresponds to the calculation of the 5 day variance of the liquid level in the tank.

Table 1 indicates the interaction between the apparatus and the user for initial set up of the tank parameters. After initial application of electric power to the apparatus and performance of an automated self test routine, the display 130 generates the user prompt "Ready-Function?." In order to begin the initial tank set up routine the user responds by pressing the key F3 on the keyboard 112. The apparatus in response by the user prompt "Tank Number?." The user then will enter the tank number which may be one or more digits followed by a further actuation of the F3 key to confirm the entry. If at any time during this entry the operator desires to re-enter the number then he needs only to press the C button 248 in order to cancel the prior entry and enable a re-entry.

TABLE 1

Initial Tank Set Up

| Apparatus Output | User Input |
|---|---|
| Ready - Function? | F3 |
| Tank Number? | ##F3 |
|  | C (to redo) |
| Tank Diameter? | ##F3 |
| Tank Length? | ##F3 |
| Tank Tilt Angle? | ##F3 |
| Offset Length? | ##F3 |
| Overall Depth? | ##F3 |
| Tank Number? | ##F3 (next tank) |
|  | R (complete) |
| Ready - Function? |  |

The apparatus then prompts the user to enter assorted tank parameters which are employed in computing the volume of the tank. In each case the display 130 generates a user prompt requesting the input of the desired information. The user responds by entering the number desired via the digit keys 242 followed by actuation of the F3 key to confirm this entry. As noted above, the user may enter C key 248 to cancel the present entry and restart if he has made an error. These tank parameters include: the tank diameter D; the tank length L; the tank tilt angle theta; the offset length I, which is the distance from the low end of the tank to the location of the fill pipe; and the overall depth DT, which is the distance from the top of the fill pipe to the bottom of the tank. This process is illustrated at Table 1 above. During this input process the central processing unit 110 is receiving the data input by the user and storing it in a portion of data memory 136 corresponding to the previously entered tank number. Thus this data is stored for later use in computation of the volume of liquid in the tank.

Once this input process is complete the electronic tank level monitoring device generates the user prompt "Tank Number?" If the user desires to enter the parameters for another tank then the user enters the digits from digit keys 242 corresponding to the next tank number and the function key F3. On the other hand, if the user is finished with entering tank parameters for all tanks then the user presses R key 246. This causes the central processing unit 110 to complete the process of entering the initial tank set up parameters. At this time the display 130 generates the user prompt "Ready-Function?" In this state the electronic tank level monitoring device 100 is in a mode for receiving another input command for another type of operation.

In the event that the user desires the apparatus to determine the electronic tank level monitoring device to determine the liquid level in the tank, equivalent to obtaining a manual stick reading, then the user responds to the "Ready-Function?" prompt by pressing the function key F1. Central processing unit 110 then enters a subroutine for measurement of the distance to the liquid level. Central processing unit 110 causes display 130 to display the user prompt "Tank Number?" In response to this user prompt the operator enters the digits of the tank number via digit keys 242 and subsequently presses the function key F1. As explained above if the operator inadvertently enters the wrong digit, the display can be cleared for re-entry by pressing the C key 248.

Central processing unit 110 then causes display 130 to generate the user prompt "Sensor In Place? " The user responds to this user prompt by setting the fill pipe head device 210 in proper position over the fill pipe. As noted above, this ensures that the transducer 117 is in proper position relative to the fill pipe for the depth measurement. The operator then responds by pressing R key 246, indicating that the sensor is in proper position.

Central processing unit 110 refers to a program stored within program memory 132 to control the process of measuring the depth of the liquid level within the tank. Firstly, central processing unit 110 causes transmit pulser 116 to control transducer 117 to generate a ultrasonic sound pulse which is directed down the fill pipe. Transmit pulser 116 is employed because in a typical transducer 117 would require a greater peak power during transmission than ordinarily can be supplied by the power supply of electronic liquid level monitoring device 100. Accordingly, transmit pulser 116 preferably includes some form of energy storage device, such as a capacitor, in order to enable supply of the peak power required by transducer 117. In accordance with the preferred embodiment of the present invention, transducer 117 operates at a frequency of 40 kilohertz and is triggered to generate a burst of 16 cycles when triggered by transmit pulser 116.

At the same time central processing unit 110 triggers transmit pulser 116, a real time clock is begun. Transducer 117 generates an electrical signal indicative of a return echo corresponding to its transmitted ultrasonic pulse. This indication of the return pulse is supplied to central processing unit 110 which thereupon stops the elapsed timer. This elapsed time corresponds to the distance from the fill pipe head 210 to the liquid level within the tank.

In accordance with the preferred embodiment of the present invention the computation of the liquid depth employs a correction factor corresponding to the temperature. Internal temperature sensor 133 generates an analog indication of the ambient temperature. Internal temperature sensor 133 is preferably a temperature sensitive resistor in a voltage divider circuit driven by a stable voltage. The voltage across internal temperature sensor 133 is thus an analog indication of the ambient temperature. This analog indication of the ambient temperature is applied to analog-to-digital converter 132. Analog-to-digital converter 132 generates a digital signal indicative of the temperature measured by internal temperature sensor 133 which is suitable for use and computation by central processing unit 110. This computation occurs in accordance with the following equation:

$$CD = t * (333.4 + 0.607 * C)$$

where CD is the distance to be computed in meters; t is the return echo time interval in seconds; and C is the measured temperature in degrees Celsius. If the computed distance CD is desired in inches rather than in meters then the computed distance in meters can be multiplied by 39.37 to obtain the computed distance in inches Central processing unit 110 preferably performs a plurality of such measurements in order to take into account any deviations in the measured distance caused by ripples or waves within the liquid in the tank. In accordance with the preferred embodiment the central processing unit 110 is controlled by the program within program memory 134 to take three such measurements initially. If the three measurements vary by no more than 1% then the average of these three time measurements is employed in the distance computation. If these three readings differ by more than 1%, then a second set of three such readings is taken. If this second set of three readings deviate by less than 1%, then this second set of readings is employed in the distance computation. If the variation in this second set of three measurements is greater than 1%, then a third set of three such measurements is taken. Likewise if the measurements in this third set deviate by less than 1%, then the average of these three measurements in the third set is employed in the computation of the time. If, however, the variation in this third set of three measurements is greater than 1%, then a differing average is taken. Firstly, the highest and the lowest time readings of the nine time readings are excluded and an average is taken from the remaining seven readings. This average is then employed in the distance computation noted above.

TABLE 2

| Stick Reading | |
|---|---|
| Apparatus Output | User Input |
| Ready - Function? | F1 |
| Tank Number? | ##F1 |
| | C (to redo) |
| Sensor in Place? | R |
| Three Beeps | |
| Stick Reading | R |
| Ready - Function? | |

At the end of this process the central processing unit 110 is programmed to generate a set of three tones via beeper 114. This set of three tones alerts the user that the distance measurement has been completed by the electronic tank level monitoring device 100. After this time central processing unit 110 causes display 130 to generate a display of the computed distance calculated as noted above. At the same time that this computed distance is displayed to the user via display 130, central processing unit 110 also stores this computed distance within memory 136 at a location corresponding to the previously entered tank number. The user acknowledges receipt of the stick reading by depressing R key 246. This causes the central processing unit 110 to display the initial prompt "Ready-Function?" on the display 130, and enter a state ready for the next operation.

Table 3 indicates the interaction between the apparatus and the user upon calculation of the volume of liquid within the tank. In response to the initial user prompt "Ready-Function?" the user actuates the function key F2. This causes central processing unit 110 to enter a subroutine liquid for computation of the volume of liquid within a tank. Central processing unit 110 next causes display 130 to enter the user prompt "Tank Number?." The user responds by entering the tank number via digit keys 242 and then pressing function key F2. As in the previous case if the user desires to cancel the entry and start again he may do so by pressing the C key 248. Central processing unit 110 next causes display 130 to generate the user prompt "Sensor In Place?." The operator responds by placing the fill pipe head device 210 in proper location on the fill pipe and pressing the R key 246. At this time central processing unit 110 controls transmit pulser 116 and receives signals from transducer 117 in order to measure the length from the top of the fill pipe to the liquid level. This process takes place as previously described above in conjunction with the description of the taking of a stick reading and is illustrated in brief in Table 3 below. Using this computed distance and the previously stored tank parameters for the designated tank number, central processing unit 110 calculates the volume in the tank.

TABLE 3

| Volume in Tank | |
|---|---|
| Apparatus Output | User Input |
| Ready - Function? | F1 |
| Tank Number? | ##F2 |
| | C (to redo) |
| Sensor in Place? | R |
| Three Beeps | |
| Volume in Tank | |
| Ready - Function? | |

The computation of the volume of liquid in the tank takes place in the manner illustrated in the program listed below in Table 4. Line numbers 100 to 160 set the variables in this computation equal to the previously stored tank parameters for the selected tank number. Line numbers 170 to 200 set the radius equal to half the diameter, set the value of the constant PI and convert the tilt angle from degrees into radians. This conversion from degrees to radians is necessary for the trigonometric computations appearing later. Line numbers 210 to 430 are the computation of the volume of the tank. Of special note is line numbers 310 to 380. This set of lines is a discrete integration loop to take into account the effect of tilt angle of the tank on the depth and the resultant volume of the liquid in the tank. Also note, line number 400 in which the volume is corrected by a conversion factor F. This conversion factor is selected differently for English units (inches and gallons) than for metric units (meters and liters).

TABLE 4

| Volume Calculation | | |
|---|---|---|
| 100 | REM | Set Variables to Stored Tank Parameters |
| 110 | REM | for Tank# Selected |
| 120 | D = | Diameter(Tank#) |
| 130 | L = | Length(Tank#) |
| 140 | Theta = | Tank_Tilt_Angle(Tank#) |
| 150 | I = | Offset(Tank#) |
| 160 | DT = | Overall_Depth(Tank#) |
| 170 | REM | Set Constants/ Convert Theta to Radians |
| 180 | R = D / 2 | |
| 190 | PI = 3.14159265 | |
| 200 | Theta = PI * Theta / 180 | |
| 210 | REM Tank Volume Computation | |
| 220 | S1 = 2 * R − I * Tan(Theta) | |
| 230 | SI = DT − CD | |
| 240 | S = SI + I * Tan(Theta) | |
| 250 | H = S − R | |
| 260 | K = L | |

TABLE 4-continued
Volume Calculation

```
270    If SI + ( L - I ) * Tan(Theta) then 140
280    K = S / Tan(Theta)
290    V = O
300    A = H - ( K / 2 ) * Tan(Theta) / 100
310    REM        Integration Loop for Accumulation of
320    REM        Effect of Tilt on Volume
330    For J = 1 to 100
340    X = SQR(( R * R ) - ( A * A ))
350    V = V + ( A * X ) + R * R * Atn( A / X )
360    A = A - K * Tan(Theta) / 100
370    Next J
380    REM        End of Integration Loop
390    V = ( R * R * K * PI / 2 ) + ( V * K / 100 )
400    V = V / F
410    REM        V is Calculated Tank Volume
420    REM        F is English/Metric Conversion Factor
430    END
```

Electronic liquid level monitoring apparatus 100 can also be employed to calculate a five-day running variance in the liquid level. This process is outlined at Table 5. At the primary user prompt "Ready Function?" the user selects function key F4. Central processing unit 110 then causes display 130 to request the tank number via user prompt "Tank Number?". The user then enters the tank number via digit keys 242 and presses the function key F4. Central processing unit 110 next causes display 130 to request the volume delivered to the tank via the prompt "Volume Delivered?" The user enters the units used in the present unit via digit keys 242 and then presses function key F4. Central processing unit 110 next causes display 132 request a water reading via the user prompt "Water Reading?" The user responds with numbers via digit keys 242 and then presses function key F4. Central processing unit 110 then causes display 132 to ask if the inputs are correct via the prompt "Inputs Correct?" The user presses R key 146 if the entries are correct and C key 248 if he desires to re-enter one or more of the entries. If the C key 248 is entered, the central processing unit 110 repeats the prompts from the request for the tank number.

TABLE 5
Five Day Variance

| Apparatus Output | User Input |
| --- | --- |
| Ready - Function? | F4 |
| Tank Number? | ## F4 |
| Volume Delivered? | ## F4 |
| Water Reading? | ## F4 |
| Inputs Correct? | R (if correct) |
|  | C (to redo) |
| Output Variance | F3 |
| Tank Number? | ## F2 |

Central processing unit 110 then calculates the variance as follows. The variance equals the previous days' volume plus deliveries since the previous day minus the current volume. This variance is then stored in data memory 136 at a location corresponding to the previously selected tank number. If there are no leaks or inflows into the tank, then this variance should be zero each time it is measured. Due to inaccuracies in the measurement of the volume and in the measurement of liquid inflows and outflows, the variance will typically be a value near zero which may oscillate between positive and negative numbers. In the event that the variance is a positive number, then the tank is leaking. In the event that the variance is a negative number, then the tank is experiencing a net inflow. Central processing unit 110 causes display 130 to output this variance via display 130. The user may then request the variance calculation for the next tank by pressing the function key F3. Central processing unit 110 is preferably programmed to store a five-day rotating set of variance figures replacing the oldest with the newest calculated variance figure within data memory 136 at memory locations corresponding to the selected tank number.

FIG. 1 illustrates external temperature sensor 150. External temperature sensor 150 is employed in a short term leak determination. This short term leak determination requires that the user place external temperature sensor 150 into the liquid, typically in a position midway within the volume of the liquid. The external temperature is then measured via external temperature sensor 150 through analog to digital converter 132. External temperature sensor 150 is then disconnected, which automatically reconnects internal temperature sensor 133. Then a volume measurement is taken via electronic tank level device 100 in a manner previously disclosed. At some later time, typically between two and 24 hours later, the same procedure is repeated. However, at this time the liquid temperature measured by the external temperature sensor 150 may be different. The short term variance is calculated as follows:

$$Vr = ((T1 * (\text{Volume 1}) * Ftn) - (T2 * (\text{Volume 2}) * Ftn))$$

where Vr is the calculated volume variance, T1 is the first measured temperature, T2 is the second measured temperature, Volume 1 is the first measured volume, Volume 2 is the second measured volume, and FTn is the volumetric coefficient of expansion of the liquid in the tank. The volumetric coefficient of expansion factors for typical liquids for which the electronic tank field monitoring device would be employed are given below in Table 6.

TABLE 6
Temperature Coefficient of Expansion

| Liquid | Factor |
| --- | --- |
| Diesel Fuel | 0.00045 |
| Gasoline | 0.00068 |
| Gasohol (10% Ethanol) | 0.000674 |
| Gasohol (10% Methanol) | 0.000685 |
| Fuel Oil #1 | 0.00049 |
| Fuel Oil #2 | 0.00046 |
| Fuel Oil #3 | 0.00040 |
| Jet Fuel (FP4) | 0.00056 |

Program memory 134 preferably includes a subprogram for exchange of data between the electronic liquid level monitoring apparatus 100 and an external device via modem 138. In particular it would be highly useful to be able to transmit to an external device, such as a computer, the daily volume measurements and the variance measurements for a plurality of storage tanks. This would involve the transmission of data from data memory 136 to modem 138 via bus 120 and hence via a communications medium (not shown) to the external computer. This external computer could then be programmed to provide periodic reports on the status of the storage tanks. For example, this system could be used to monitor the level of the storage tanks for reordering to refill the respective tanks as they are emptied. Alternately, the external computer could provide long term leakage reports that may be required by regulatory authorities.

As a further embodiment, the modem 138 can be used to transmit program changes to the electronic liquid level monitoring apparatus 100. Program memory 134 can be provided with a subprogram to receive program instructions from an external device via modem 138 for storage in program memory 134. For example, the apparatus could be initially programmed to make stick measurements only. If the user desires to up grade the capacity of apparatus 100, then additional program instructions would be stored in program memory 134 which are supplied from a communications medium (not shown) to modem 138 and stored in program memory 134 via bus 120. Standby power supply 135 insures that program memory 134 retains this new program even when the main power is turned off via main power switch 250. In the preferred embodiment the electronic liquid level monitoring apparatus 100 is programmed in the following modular steps: (1) stick measurement only; (2) stick measurement and volume computation; and (3) stick measurement, volume computation and variance computation. By this means a single hardware apparatus can have a variety of functions depending upon the particular programming supplied.

I claim:

1. An electronic liquid level monitoring apparatus for a storage tank having a substantially vertical fill pipe comprising:
   an ultrasonic transducer for converting a transmit electrical impulse into ultrasonic sound and for converting ultrasonic sound into a corresponding receive electrical impulse;
   a fill pipe head device having a set of concentric circular ridges with said ultrasonic transducer mounted in the center thereof for positioning said ultrasonic transducer at a fixed position relative to the fill pipe of the storage tank, said set of concentric circular ridges enabling accommodation of a plurality of differing fill pipe diameters;
   a control device pivotally coupled to said fill pipe head device and electrically connected to said ultrasonic transducer for
      transmitting a transmit electrical impulse to said ultrasonic transducer,
      receiving a receive electrical impulse from said transducer indicating the receipt of ultrasonic sound by said transducer,
      measuring the length of time from the transmitting of said transmit electrical impulse to the receiving of said receive electrical impulse, and
      generating a distance signal indicating the distance from said ultrasonic transducer to a liquid level based upon said measured length of time.

2. The electronic liquid level monitoring apparatus as claimed in claim 1, further comprising:
   a visual display means connected to said control means for generating a visually perceivable indication of said distance signal.

3. The electronic liquid level monitoring apparatus as claimed in claim 1, further comprising:
   a temperature measuring device for generating a temperature signal indicative of the ambient temperature; and
   wherein said control means is further connected to said temperature measuring means for generating said distance signal based upon the speed of sound at the temperature indicated by said temperature signal.

4. The electronic liquid level monitoring apparatus as claimed in claim 1, further comprising:
   a tank parameter memory means for storing therein a plurality of tank parameters including tank dimensions;
   wherein said control means is further connected to said tank parameter memory means for generating a volume signal indicating the volume of liquid in the tank based upon said measured distance and said stored tank parameters.

5. The electronic liquid level monitoring apparatus as claimed in claim 4, further comprising:
   a visual display means connected to said control means for generating a visually perceivable indication of said volume signal.

6. An electronic liquid level monitoring apparatus for a plurality of storage tanks, each storage tank having a substantially vertical fill pipe, said electronic liquid level monitoring apparatus comprising:
   an ultrasonic transducer for converting a transmit electrical impulse into ultrasonic sound and for converting ultrasonic sound into a corresponding receive electric impulse;
   a fill pipe head device having said ultrasonic transducer monitor therein for locating said ultrasonic transducer at a fixed position relative to the fill pipe of any one of said plurality of storage tanks;
   a tank parameter memory means for storing therein a plurality of tank parameters for each storage tank of said plurality of storage tanks, said plurality of tank parameters including for each storage tank at least one tank dimension of the overall depth of the storage tank from the top of the fill pipe to the bottom of the storage tank;
   a control means connected to said ultrasonic transducer and said tank parameter memory means, for
      transmitting a transmit electrical impulse to said ultrasonic transducer,
      receiving a receive electrical impulse from said ultrasonic transducer indicating the receipt of ultrasonic sound by said transducer,
      measuring the length of time from the transmitting of said transmit electrical impulse to the receiving of said receive electrical impulse, and
      calculating a liquid depth signal indicating the liquid depth within the selected storage tank by recalling from said tank parameter memory means said overall depth of said selected storage tank and subtracting from said recalled overall depth a distance based upon said measured length of time; and
   a hand portable housing having said ultrasonic transducer, said fill pipe head device, said tank parameter memory means and said control means disposed therein, said hand portable housing permitting said electronic liquid level monitoring apparatus to be hand carried to the fill pipe of said selected storage tank.

7. The electronic liquid level monitoring apparatus as claimed in claim 6, further comprising:
   said control means further includes means for calculating a volume signal indicating the volume of liquid in said selected storage tank based upon said liquid depth signal and said stored tank parameters corresponding to said selected storage tank.

8. The electronic liquid monitoring apparatus as claimed in claim 7, further comprising:

a visual display means connected to said control means for generating a visually perceivable indication of said volume signal.

9. The electronic liquid level monitoring apparatus as claimed in claim 7, further comprising:
an internal temperature measuring device for generating a temperature signal indicative of the ambient temperature; and
wherein said control means is further connected to said temperature measuring means for generating said internal overall depth signal based upon the speed of sound for the temperature indicated by said temperature signal and said measured length of time from the transmitting of said transmit electrical impulse to the receiving of said receive electrical impulse.

10. The electronic liquid level monitoring apparatus as claimed in claim 9, further comprising:
a tank data means connected to said control means having at least one memory location corresponding to each of said plurality of storage tanks for storing data therein;
an external temperature measuring device disposed external to said hand portable housing in a manner permitting immersion in the liquid in said selected storage tank;
said hand portable housing further including a connector means for alternative connection of either said internal temperature measuring device or said external temperature measuring device to said control means; and
said control means includes means for calculating a volume variance by
performing a first measurement sequence by connection of said external temperature measuring device, immersion of said external measuring device in the liquid in said selected storage tank, measuring a first liquid temperature, connection of said internal temperature measuring device, calculating a first volume signal, and storing said first liquid temperature and said first volume signal in said tank data memory means at a memory location corresponding to said selected storage tank,
performing a second measurement sequence at least two hours after said first measurement sequence by connection of said external temperature measuring device, immersion of said external measuring device in the liquid in said selected storage tank, measuring a second liquid temperature, connection of said internal temperature measuring device, calculating a first volume signal, and storing said second measured temperature and said second volume signal in said tank data memory means at a memory location corresponding to said selected storage tank, and
calculating said volume variance in accordance with the following equation $$Vr = ((T1*(\text{Volume 1}) * Ftn) - (T2*(\text{Volume 2})*Ftn))$$

where Vr is the volume variance to be calculated, T1 is the first measured temperature, T2 is the second measured temperature, Volume 1 is the first volume signal, Volume 2 is the second volume signal and Ftn is the volumetric coefficient of expansion of the liquid in said selected storage tank.

11. The electronic liquid level monitoring apparatus as claimed in claim 7, further comprising:
a manually actuable keyboard device for receiving operator inputs indicating a particular one of said plurality of storage tanks and operator inputs corresponding to tank dimensions;
said tank parameter memory means stores therein said plurality of tank parameters including tank dimensions for each of said plurality of storage tanks;
a tank data memory means connected to said control means having at least one memory location corresponding to each of said plurality of storage tanks for storing therein volume data corresponding to said volume signal;
wherein said control means is further connected to said keyboard device and said tank data memory means for
initialization of said tank parameter memory means by receiving from said keyboard device one of said operator inputs indicating a particular one of said plurality of storage tanks and said operator inputs corresponding to tank dimensions for each of said plurality of storage tanks and storing tank dimension data in said tank parameter memory means corresponding to tank dimensions for each of said plurality of storage tanks,
for monitoring a selected one of said plurality of storage tanks by receiving from said keyboard device said operator inputs indicating a particular one of said plurality of storage tanks, calculating said liquid depth signal from said overall depth of said storage tank indicated by said keyboard device stored in said tank parameter memory means, calculating said volume signal based upon said liquid depth signal and said stored tank dimensions of said storage tank indicated by said keyboard device stored in said tank parameter memory means, and storing said volume signal in said tank data memory means at said memory location corresponding to said storage tanks indicated by said keyboard device.

12. The electronic liquid level monitoring apparatus as claimed in claim 11, wherein:
said manually actuable keyboard device further includes means for receiving operator inputs indicating liquid inflows and outflows for said selected storage tank; and
said control means further includes means for
calculating a volume variance signal for said selected storage tank equal to the volume signal last stored in said corresponding memory location of said tank data memory means for said selected storage tank plus the liquid inflows, minus the liquid outflows and minus the present volume signal for said selected storage tank, and storing said volume variance signal in a memory location in said tank data memory means corresponding to said selected storage tank.

13. The electronic liquid level monitoring apparatus as claimed in claim 11, further comprising:
a communication device connected to said tank data memory means for transmitting said volume data stored in said tank data memory means for each of said plurality of storage tanks to an external device.

14. The electronic liquid level monitoring apparatus as claimed in claim 6, wherein:
said control means calculates said liquid depth signal in accordance with the sequence thrice transmitting said transmit electrical impulse to and receiving said receive electrical impulse from said ultrasonic transducer and measuring said first, second and third length of time from the transmitting of said transmit electrical impulse to said receiving of said receive electrical impulse, determining whether said first, second and third lengths of time differ by more than a predetermined amount, if said first, second and third length of times do not differ by more than said predetermined amount, determining said measured length of time as the average of said first, second and third length of times, if said first, second and third length of times do differ by more than said predetermined amount, thrice transmitting said transmit electrical impulse to and receiving said receive electrical impulse from said ultrasonic transducer and measuring said fourth, fifth and sixth length of time from the transmitting of said transmit electrical impulse to said receiving of said receive electrical impulse, determining whether said fourth, fifth and sixth length of times differ by more than a predetermined amount, if said fourth, fifth and sixth length of times do not differ by more than said predetermined amount, determining said measured length of time as the average of said fourth, fifth and sixth length of times, if said fourth, fifth and sixth length of times do differ by more than said predetermined amount, thrice transmitting said transmit electrical impulse to and receiving said receive electrical impulse from said ultrasonic transducer and measuring said seventh, eighth and ninth length of time from the transmitting of said transmit electrical impulse to said receiving of said receive electrical impulse, determining whether said seventh, eighth and ninth length of times differ by more than a predetermined amount, if said seventh eighth and ninth length of times do not differ by more than said predetermined amount, determining said measured length of time as the average of said seventh, eighth and ninth length of times, and if said seventh, eighth and ninth length of times do differ by more than said predetermined amount, determining said measured length of time as the average of said first, second, third, fourth, fifth, sixth, seventh, eighth and ninth length of times omitting the least of and the greatest of said first, second, third, fourth, fifth, sixth, seventh, eighth and ninth length of times.

15. An electronic liquid level monitoring apparatus for a plurality of storage tanks, each storage tank having a substantially vertical fill pipe, said electronic liquid level monitoring apparatus comprising:

an ultrasonic transducer for converting a transmit electrical impulse into ultrasonic sound and for converting ultrasonic sound into a corresponding receive electrical impulse;

a fill pipe head device having said ultrasonic transducer mounted therein for locating said ultrasonic transducer at a fixed position relative to the fill pipe of a selected one of said plurality of storage tanks;

a tank parameter memory means for storing therein a plurality of tank parameters for each storage tank of said plurality of storage tanks, said plurality of tank parameters including for each storage tank at least the tank diameters of the overall depth of the storage tank from the top of the fill pipe to the bottom of the storage tank;

a tank data memory means having at least one memory location corresponding to each of said plurality of storage tanks for storing data therein;

a manually actuable keyboard device for receiving operator inputs indicating a particular one of said plurality of storage tanks and operator inputs corresponding to tank dimensions;

a display device for generating an operator perceivable visual display of user prompts;

a communication device for transmitting data to an external device;

a microprocessor control device connected to said ultrasonic transducer, said tank parameter memory means, said tank data memory means, said keyboard device, said display device and said communications device for control of liquid level monitoring; and a control program memory means connected to said microprocessor control device having a control program stored therein for causing said microprocessor control device to initialize said tank parameter memory means for a selected storage tank by causing said display device to generate a user prompt requesting selection of one of said plurality of storage tanks, receiving from said keyboard device operator inputs selecting a particular one of said plurality of storage tanks, causing said display device to generate a user prompt requesting a particular tank dimensions including the tank dimension data in said overall depth, and receiving from said keyboard device operator inputs specifying said corresponding tank dimensions, and storing tank dimension data in said tank parameter memory means corresponding to said specified tank dimensions, determine the liquid depth of a selected storage tank by causing said display device to generate a user prompt requesting selection of one of said plurality of storage tanks, receiving from said keyboard device operator inputs selecting a particular one of said plurality of storage tanks, causing said display device to generate a user prompt requesting placement of said fill pipe head in the fill pipe of said selected storage tank, receiving from said keyboard device an operator input indicating placement of said fill pipe head in the fill pipe of said selected storage tank, transmitting a transmit electrical impulse to said ultrasonic transducer, receiving a receive electrical impulse from said ultrasonic transducer indicating the receipt of ultrasonic sound by said transducer, measuring the length of time from the transmitting of said transmit electricl impulse to the receiving of said receive electrical impulse, calculating said liquid depth by recalling from said tank parameter memory means said overall depth of said selected storage tank and subtracting from said recalled overall depth a distance based upon said measured length of time, and storing said computed liquid depth in said tank data memory means in a memory location corresponded to said selected storage tank, communicate to an external device via said communications device data recalled from said tank data memory means corresponding to each storage tank having initialized tank parameters; and a hand portable housing having said ultrasonic transducer, said tank parameter memory means, said tank data memory means, said keyboard device, said display device, said communicating device, said microprocessor control device and said control memory means disposed therein, said hand portable housing permitting said electronic liquid level monitoring apparatus to be hand carried to the fill pipe of said selected storage tank.

16. The electronic liquid level monitoring apparatus as claimed in claim 15, wherein:

said control program memory means includes at least some read/write memory, and said control program stored therein for further causing said microprocessor control device to receive at least one additional portion of control program from an external device via said communications device and to store said additional portions of control program in said read/write memory of said control program memory.

17. The electronic liquid level monitoring apparatus as claimed in claim 16, wherein:

one of said at least one additional portion of control program for further causing said microprocessor control device to recall tank dimensions for said selected storage tank from said tank parameter memory means, calculate a volume signal indicating the volume of liquid in said selected storage tank based upon said liquid depth signal and said recalled tank dimensions, storing said volume signal in said tank data memory means in a memory location corresponding to said selected storage tank, and wherein said data recalled from said tank data memory means communicated to the external device via said communications device includes said volume signal.

18. The electronic liquid level monitoring apparatus as claimed in claim 17, wherein:

one of said at least one additional portion of control program for further causing said microprocessor control device to cause said display device to generate a user prompt requesting indication of liquid inflows into said selected storage, receive from said keyboard device operator inputs indicating liquid inflows into said selected storage tank, cause said display device to generate a user prompt requesting indication of liquid outflows from said selected storage, receive from said keyboard device operator inputs indicating liquid outflows from said selected storage tank, calculate a volume variance signal for said selected storage tank equal to the volume signal last stored in said corresponding memory location of said tank data memory means for said selected storage tank plus said indicated liquid inflows, minus said indicated liquid outflows minus the last calculated volume signal for said selected storage tank, storing said volume variance signal in said tank data memory means in a memory location corresponding to said selected storage tank, and wherein said data recalled from said tank data memory means communicated to the external device via said communications device includes said volume variance signal.

19. The electronic liquid level monitoring apparatus as claimed in claim 15, wherein:

said communications device consists of a modem.

* * * * *

UNITED STATES PATENT AND TRADEMARK OFFICE
CERTIFICATE OF CORRECTION

PATENT NO. : 4,853,694

DATED : August 1, 1989

INVENTOR(S) : Tomecek

It is certified that error appears in the above-identified patent and that said Letters Patent is hereby corrected as shown below:

Column 8, line 26, "F1" should be --F2--.

Signed and Sealed this

Tenth Day of July, 1990

Attest:

HARRY F. MANBECK, JR.

*Attesting Officer*  *Commissioner of Patents and Trademarks*